(12) United States Patent
Desjardins et al.

(10) Patent No.: US 6,644,672 B2
(45) Date of Patent: Nov. 11, 2003

(54) REPLACEMENT SKATES FOR A SCOOTER

(76) Inventors: Yvon Desjardins, 451 Cheval Blanc, Gatineau, Quebec (CA), J8P 6P4; Marcel Roy, 123 de Tadoussac, Gatineau, Quebec (CA), J8T 7J7

( * ) Notice: Subject to any disclaimer, the term of this patent is extended or adjusted under 35 U.S.C. 154(b) by 0 days.

(21) Appl. No.: 10/071,186

(22) Filed: Feb. 11, 2002

(65) Prior Publication Data

US 2002/0109311 A1 Aug. 15, 2002

(30) Foreign Application Priority Data

Feb. 12, 2001 (CA) .............................................. 2331930
Nov. 22, 2001 (CA) .............................................. 2363619

(51) Int. Cl.[7] .............................................. B62K 13/00
(52) U.S. Cl. ................. 280/7.13; 280/14.25; 280/87.05
(58) Field of Search ........................ 280/10, 7.12, 7.13, 280/7.14, 14.25, 26, 14.28, 14.21, 14.27, 28, 8, 87.05, 87.041, 845, 12.1; D12/6, 7, 8, 9; D21/423

(56) References Cited

U.S. PATENT DOCUMENTS

| 1,394,430 | A | * | 10/1921 | Koster ..................... 280/14.28 |
| 1,560,928 | A | * | 11/1925 | Wolpert ................... 280/14.28 |
| 1,604,680 | A | | 3/1926 | Chapman |
| 1,663,060 | A | * | 3/1928 | Rainey ..................... 280/7.14 |
| 1,681,297 | A | | 8/1928 | Lindroos |
| 1,706,048 | A | * | 3/1929 | Van De Mark ........ 280/87.041 |
| 1,745,643 | A | * | 2/1930 | Roessel .................... 280/7.12 |
| 2,101,229 | A | | 12/1937 | Anderson |
| 2,316,272 | A | * | 4/1943 | Meyer ..................... 280/14.28 |
| 4,160,552 | A | | 7/1979 | Kupka |
| 4,262,767 | A | | 4/1981 | Weygant |
| D364,127 | S | * | 11/1995 | Scherr et al. ................ D12/6 |
| 6,139,031 | A | | 10/2000 | Wingard |
| 6,260,866 | B1 | | 7/2001 | Cheng |
| 6,474,660 | B1 | * | 11/2002 | Warren ..................... 280/7.12 |

FOREIGN PATENT DOCUMENTS

| DE | 42 00 626 A1 | 7/1993 |
| EP | 0553746 | 8/1993 |
| FR | 2561115 | 9/1985 |

* cited by examiner

*Primary Examiner*—Brian L. Johnson
*Assistant Examiner*—Brian L Swenson
(74) *Attorney, Agent, or Firm*—Shapiro Cohen; Dennis R. Haszko

(57) ABSTRACT

A set of replacement skates for a scooter. The replacement skates are designed such that each replacement skate can replace a wheel on the scooter. Each replacement skate includes both a skate blade and a support structure. The support structure has two cross-sectional areas. The first cross-sectional sectional area is larger than the second cross-sectional sectional area such that the first cross-sectional area is oriented away from the scooter and the second cross-sectional area is oriented toward the footboard of the scooter. A kit may also be provided with a front end replacement skate and a rear end replacement skate. Both replacement skates have attachment means for fastening the skates to the scooter using the seine pins and fasteners used to attach the wheels.

17 Claims, 5 Drawing Sheets

REPLACEMENT SKATES FOR A SCOOTER

FIELD OF INVENTION

The present invention relates to replacement skates for a scooter for use in the winter season. More particularly, this invention relates to two replacement skates that have been adapted to replace the two wheels on the scooter using the same screws which have attached the wheels to the scooter.

BACKGROUND TO THE INVENTION

The scooter is either considered an amusing toy for children or a transportation means for adults. The dictionary definition for a scooter is that of a child's toy consisting of a footboard mounted on two wheels with a long steering handle, propelled by resting one foot on the footboard and pushing the other against the ground. Unfortunately, the scooter has certain deficiencies in that it may only be used during the summer months or in climates where winter, ice, and snow do not a pose concern. For those who inhabit cooler climates, the winter, fall, and possibly spring months, provide snow on the gravel roads and ice covering most bodies of water. In such snowy and icy conditions, the scooter cannot be driven through the snow since the wheels will get stuck in the snow. Similarly, the scooter may actually be dangerous on ice, as there is a lack of sufficient friction between the ice and the wheels. This lack of friction prevents the wheels from gripping the icy surface.

The present invention seeks to overcome the above shortcomings by providing a set of replacement skates for the wheels on the scooter so that the scooter can be utilized in the winter months.

SUMMARY OF THE INVENTION

The present invention seeks to provide a set of replacement skates for a scooter. The replacement skates are designed such that each replacement skate can replace a wheel on the scooter. A kit may also be provided with a front end replacement skate and a rear end replacement skate. Both replacement skates have attachment means for fastening the skates to the scooter using the same pins and fasteners used to attach the wheels.

In a first aspect, the present invention provides a replacement skate for a wheel on a scooter, the scooter having a first attachment means for attaching the wheel to the scooter, the replacement skate including:
  a skate blade; and
  a second attachment means located in the skate blade, the second attachment means matching the first attachment means such that the replacement skate can be used as a replacement for the wheel.

In a first aspect, the present invention provides a replacement skate for a wheel on a scooter, the scooter having a footboard and a first attachment means for attaching the wheel to the scooter, the replacement skate including:
  a skate blade;
  a support structure attached to the blade, the support structure having a first cross-sectional area and a second cross-sectional area, the first cross-sectional area is larger than the second cross-sectional area such that the first cross-sectional area is oriented away from the scooter and the second cross-sectional area is oriented toward the footboard of the scooter; and
  a second attachment means located in the support structure, the second attachment means matching the first attachment such that the replacement skate can be used as a replacement for the wheel.

In a second aspect, the present invention provides a set of at least two replacement skates for a scooter having a set of at least two wheels, the scooter having a footboard and a plurality of first attachment means for attaching each of the at least two wheels to the scooter, wherein each wheel is attached to the scooter with one of the plurality of first attachment means, each replacement skate including:
  a skate blade;
  a support structure attached to the blade, the support structure having a first cross-sectional area and a second cross-sectional area, the first cross-sectional area is larger than the second cross-sectional area such that the first cross-sectional area is oriented away from the scooter and the second cross-sectional area is oriented toward the footboard of the scooter; and
  a second attachment means located in the support structure, the second attachment means matching one of the plurality of first attachment means such that the skate can be used as a replacement for the wheel.

In a third aspect, the present invention provides a kit for replacing two wheels on a scooter with two replacements skates, the scooter having a footboard and a first attachment means for attaching the two wheels to the scooter, the kit consisting of:
  at least two replacement skates, each replacement skate having:
    a skate blade;
    a support structure attached to the blade, the support structure having a first cross-sectional area and a second cross-sectional area, the first cross-sectional area is larger than the second cross-sectional area such that the first cross-sectional sectional area is oriented away from the scooter and the second cross-sectional sectional area is oriented toward the footboard of the scooter; and
    a second attachment means located in the support structure, the second attachment means matching the first attachment means such that the skate can be used as a replacement for the wheel.

BRIEF DESCRIPTION OF THE DRAWINGS

The invention will now be described with reference to the drawings, in which.

DETAILED DESCRIPTION

Figure 1:
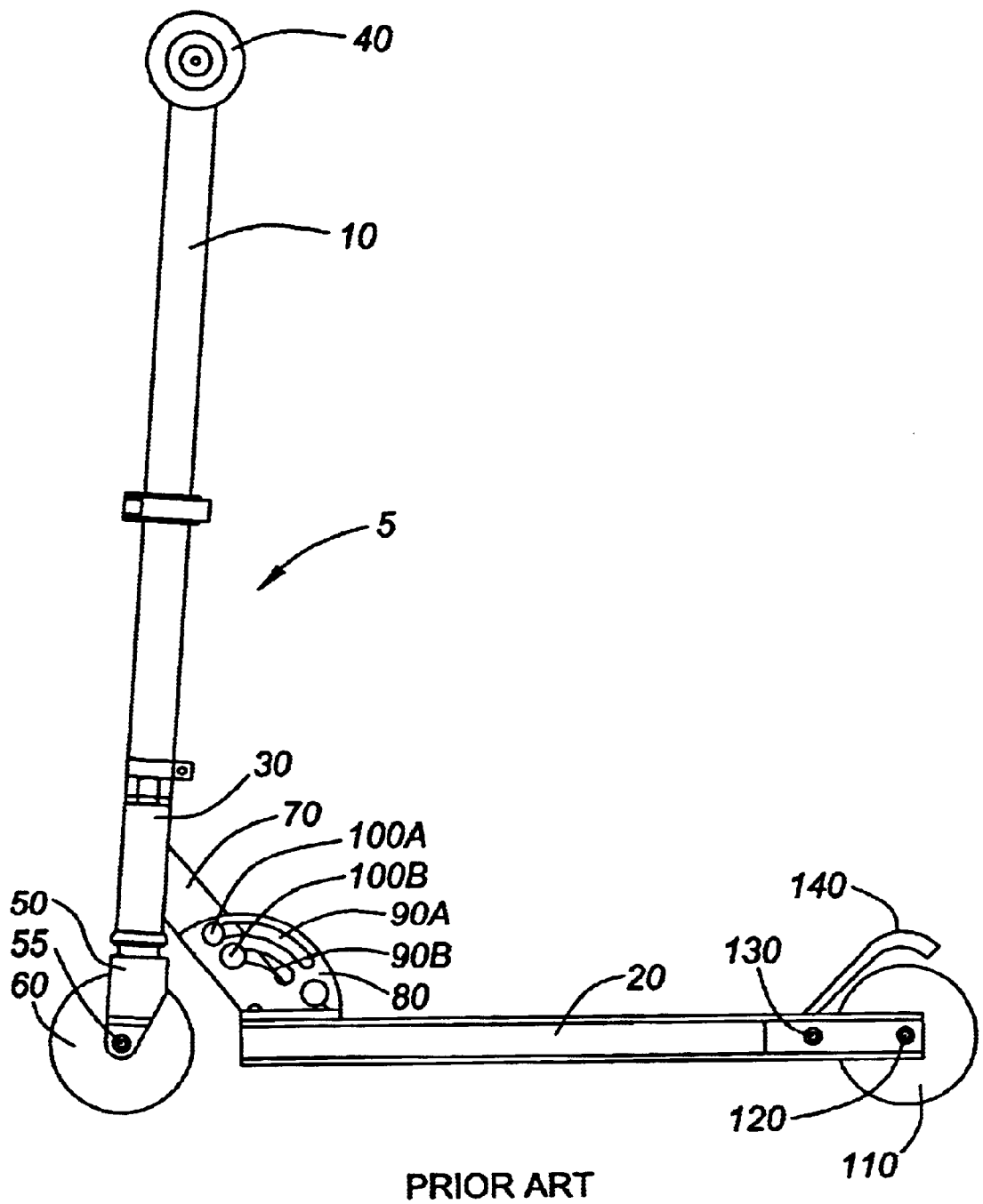
FIG. 1 illustrates a scooter with wheels according to the prior art.

FIG. 1 illustrates a scooter 5 according to the prior art. The scooter 5 consists of a shaft 10 connected to a footboard 20. The shaft is supported by a radial bearing 30 which allows the shaft 10 to rotate on its longitudinal axis. The handlebars 40, fixed onto the upper end of the shaft 10, permit the user to rotate the shaft 10 by turning the handlebars right or left. The shaft 10 extends through the lower end of the radial bearing 30 and is attached at the lower end to a wheel bracket 50. This wheel bracket 50 holds the front wheel 60 in place using a pin with two fasteners one on either side of the pin 55. A connecting piece 70 is attached between the radial bearing 30 and the footboard 20. The connecting piece 70 may be of various shapes. In FIG. 1 it is shown as a flat piece with angled ends. The angled ends permit the connecting piece 70 to be attached to both the radial bearing 30 and the footboard 20. The shaft 10 and the footboard 20 are shown as being approximately at right angles to each other.

The connecting piece 70 has a slot piece 80 with two slots 90A, 90B which enable the user to fold the scooter 5 by rotating the footboard 20 into the shaft 10. The slot piece 80 is attached to the footboard 20 in order to fold in the scooter. There are two pins 100A and 100B, attached to the connecting piece 70, which travel through the slots 90A and 90B respectively. Both slots 90A and 90B are arc-shaped. When the two pins have traveled to the opposite ends of the two slots 90A and 90B then the scooter 5 is in a folded state. The scooter 5 shown in FIG. 1 is in a functional state, as the rear wheel 110 is level with the front wheel 60 and the shaft 10 and footboard 20 are at approximately a 90 degree angle to one another. Along the footboard 20, opposite the connecting piece 70, is attached a rear wheel 110 using a conventional wheel bracket 120 with a pin holding the rear wheel 110 to the bracket 120. Between the bracket 120 and the connecting piece 70 and adjacent the bracket 120 is an attachment means 130, such as a fastener, for maintaining a mud guard 140 above the rear wheel 110. On certain scooters, the mud guard 140 is a rear brake whereby the user presses down on the brake to provide friction against the rear wheel. This effectively slows down the scooter and eventually stops the scooter.

Figure 2:
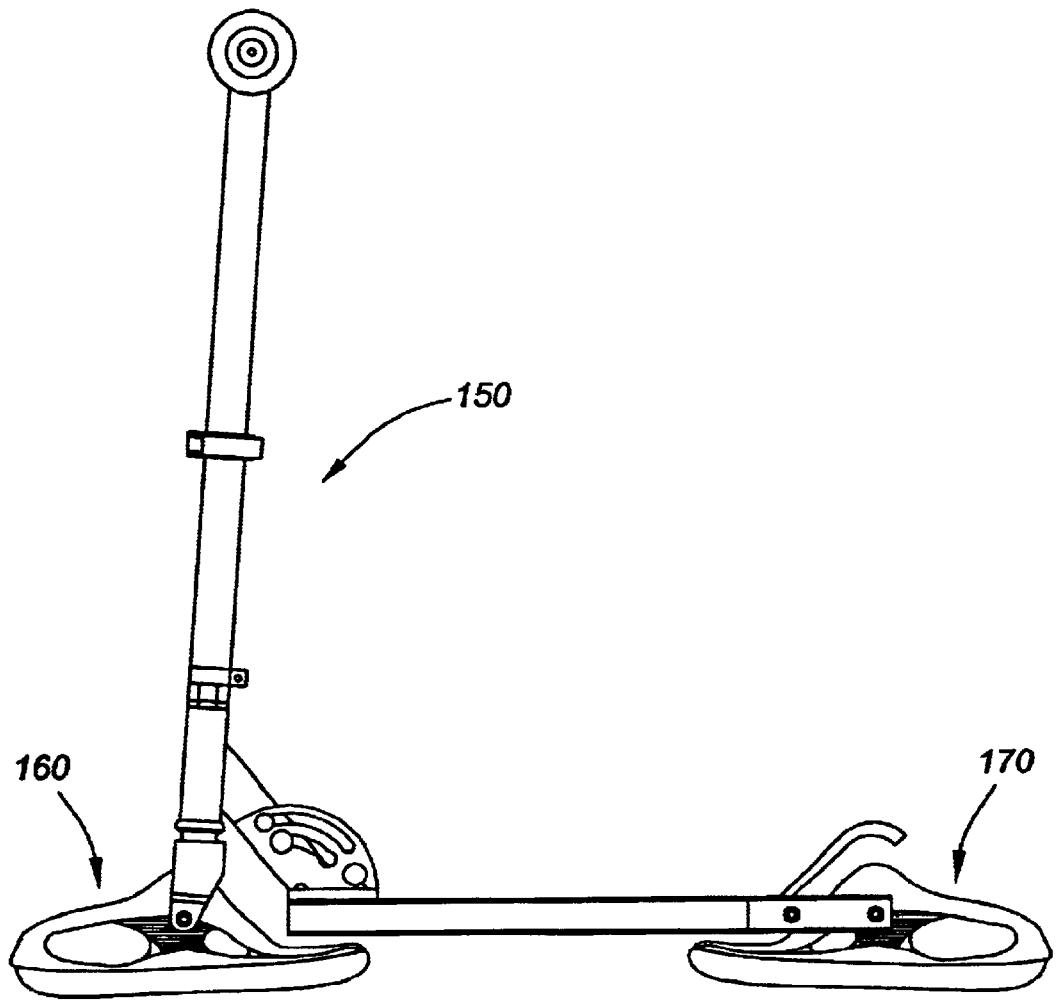
FIG. 2 illustrates a side view of the scooter with a set of two replacement skates according to the present invention.

FIG. 2 is an illustration of replacement skates shown installed on the conventional scooter 5 of FIG. 1. The difference between the scooter 5 of FIG. 1 and the scooter 150 of FIG. 2 is that the wheels 60, 120 have been replaced with replacement skates 160, 170. Apart from the replacement skates, the scooter 150 of FIG. 2 is essentially the same as the scooter 5 of FIG. 1. It should be mentioned that both replacement skates 160, 170 are identical to each other. In fact, any of the two replacement skates 160, 170 can be installed in either the front end and the rear end of the scooter 150. It will be explained in further detail below that the orientation of the replacement skates may differ according to which end of the scooter 150 they are to be attached.

Figure 3A:
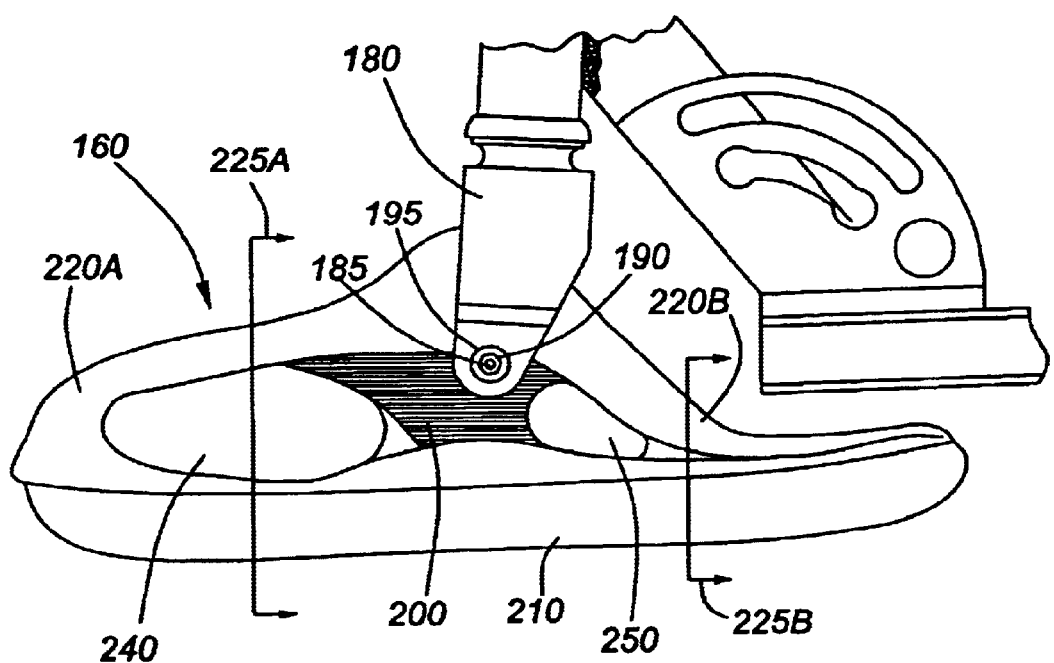
FIG. 3a is a side view of a replacement skate located at the front end of a scooter according to the present invention.

FIG. 3a illustrates the side view of the replacement skate 160 attached at the front end of the scooter 150. As can be seen, the replacement skate 160 is attached to the wheel bracket 180 with a pin 185 and two fasteners 190. The pin and fastener combination 195 is the same pin and fastener combination 55 of FIG. 1. The pin 185 may be threaded at both ends such that nuts are used for engagement with the threaded ends of the pin 185. The replacement skate 160 has a blade support structure 200. The blade support structure 200 is attached to the wheel bracket 180 by way of the pin and fastener combination 195. The pin 185 and two fasteners 190 are attached at a centrally located attachment opening in the blade support structure 200. The attachment opening (shown in FIG. 5) in the blade support structure 200 is suitably sized such that the pin 185 fits snugly in the opening. The two fasteners 190 secure the support structure 200 to the wheel bracket 180. The blade support structure 200 is attached to a skate blade 210 the same way any blade would be attached to a conventional ice skate. It can be seen from FIG. 3a that the front end 220A of the blade support structure 200 is taller than the rear end 220B of the blade support structure 200. As shown in FIG. 3a, the front end 220A has a larger first cross-sectional area 225A than the rear end 220B which has a smaller second cross-sectional area 225B. Thus, the blade support structure 200 is asymmetric in that the first cross-sectional 225A area is larger than the second cross-sectional area 225B. An asymmetric design of the blade support structure 200 enables the present invention to be implemented in scooters in an opposite orientation. Thus, the replacement skate is reversible in its orientation on the scooter. According to this embodiment of the present invention, there are two support structure openings 240, 250 in the blade support structure 200. The two openings 240, 250 are not essential parts of the blade support structure 200. Rather, the two openings decrease the weight of the replacement skate 160 so that children may easily handle the replacement skates.

Figure 3B:
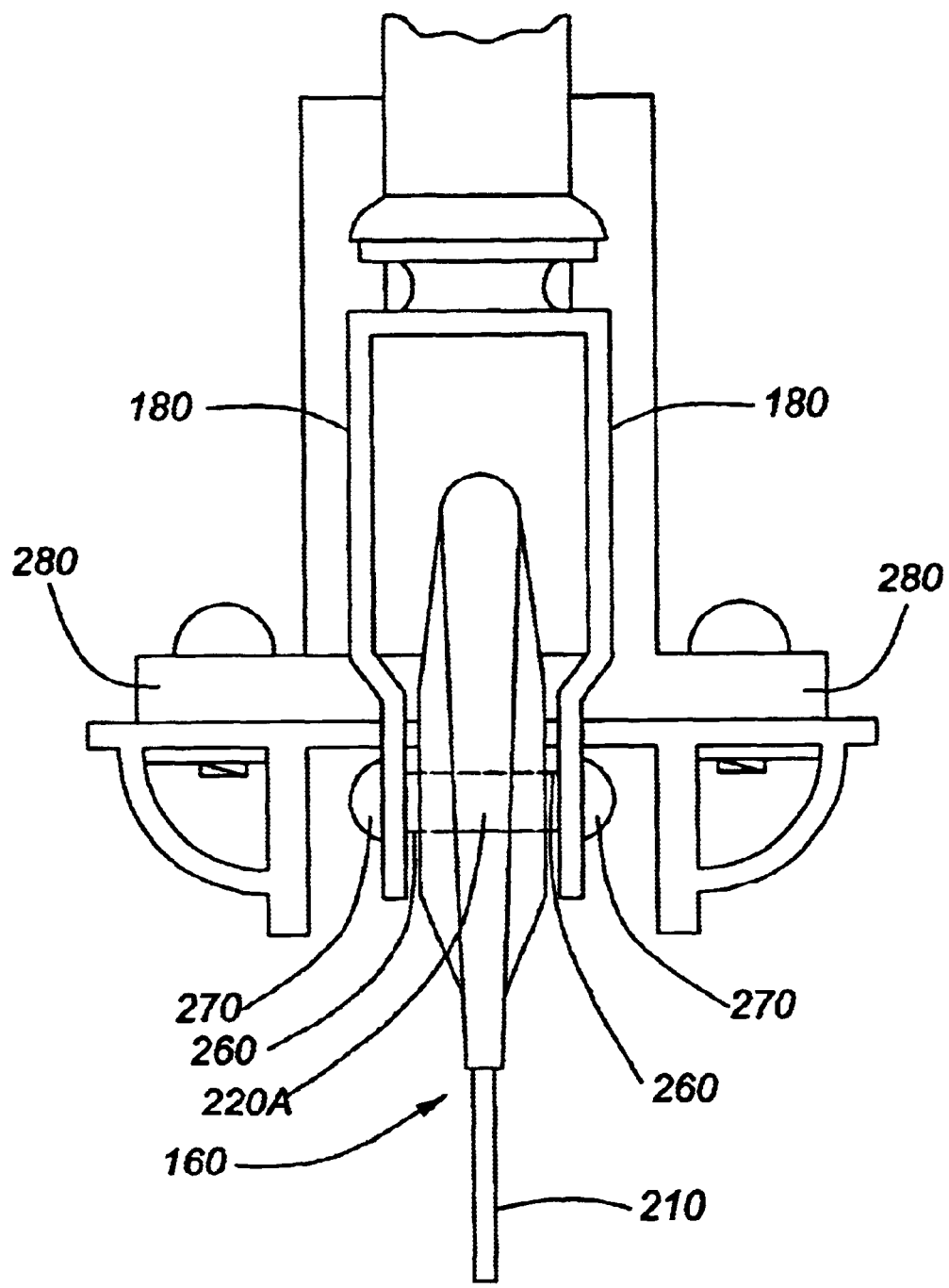
FIG. 3b is a front view of a replacement skate located at the front end of a scooter according to the present invention.

FIG. 3b illustrates a front view of the replacement skate as installed on a scooter. The wheel bracket 180 is attached to the support structure 200 of the front end replacement skate 160 by means of the pin 260 and the fastener 270 in combination. The blade support structure 260 supports the blade 210. The footboard 280 is shown extending on either side of the blade support structure 200.

Figure 4:
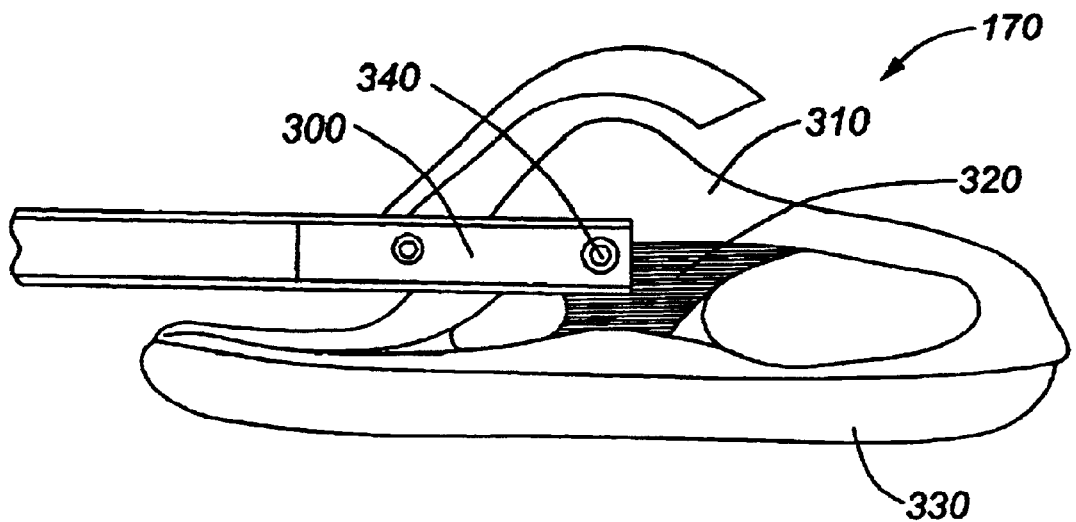
FIG. 4 is a side view of a replacement skate located at the rear end of a scooter according to the present invention.

FIG. 4 illustrates a side view of the replacement skate 170 at the rear end of the scooter 150. The replacement skate 170 is identical to the replacement skate 160 described in FIG. 3a and FIG. 3b. However, the orientation of the replacement skate 170 is opposite to that of the replacement skate 160. The support structure of the replacement skate 170 is to the rear of the scooter. The orientation of the replacement skate 170 is due to mainly to the constraints of the footboard 300. The large cross-sectional area 310 of the support structure 320 does not permit the replacement skate 170 to be oriented the same way the front replacement skate is oriented. The opposite orientation would prevent the blade 330 from being level with the footboard 300. The replacement skate is attached to the footboard by means of the pin (not shown) and the two fasteners 340 in combination. Again, the opening of the replacement skate 170 should be sized such that the pin fits snugly in the opening.

Figure 5:
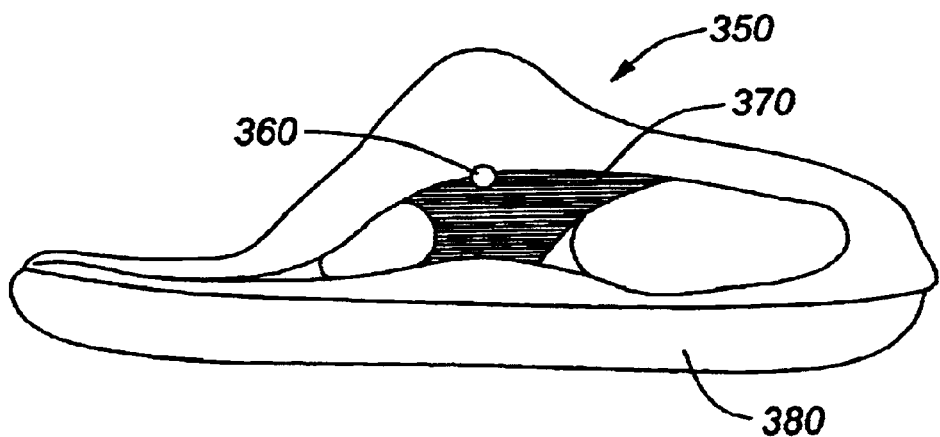
FIG. 5 illustrates a replacement skate according to the present invention.

FIG. 5 illustrates the side view of a replacement skate 350 as provided in a kit of replacement skates for a scooter. The kit would include two replacement skates 300 (second skate not shown), preferably two identical skates. Although the replacement skates are identical this need not be the case. It is conceivable that such a kit would provide a front end replacement skate that has a different support structure and a differently sized and shaped to that blade of the rear end replacement skate. The replacement skate 350 has an opening 360 centrally located in the support structure 370. The blade 380 is typically made of stainless steel but may also be made of any suitable material.

Typically the skates will be made available in pairs as a set for replacing both wheels on the scooter. Furthermore, the pins and the fasteners may not be required in the kit as the opening in the support structure is sized to fit snugly over the pin used for the wheels on the conventional scooter.

In another embodiment, it is possible that the replacement skates may be designed for any multi-wheeled device or for example, replace the wheels on children's tricycle.

We claim:

1. A replacement skate for a wheel on a scooter, the scooter having a footboard with a lower surface and a first attachment means for attaching the wheel to the scooter, the replacement skate including:

a skate blade;

a support structure attached to the blade, the support structure having a first cross-sectional area and a second cross-sectional area, the first cross-sectional are being larger than the second cross-sectional area such that the first cross-sectional area is oriented away from the scooter and the second cross-sectional area is oriented toward the footboard of the scooter; and a second attachment means located in the support structure, the second attachment means matching the first attachment means such that the replacement skate can be used as a replacement for the wheel;

wherein the support structure is asymmetric relative to the second attachment means and the second cross-sectional area is dimensioned to be beneath said footboard lower surface in use.

2. A set of at least two replacement skates for a scooter having a set of at least two wheels, the scooter having a footboard with a lower surface and a plurality of first attachment means for attaching each of the at least two wheels to the scooter, wherein each wheel is attached to the scooter with one of the plurality of first attachment means, each replacement skate including:

a skate blade;

a support structure attached to the blade, the support structure having a first cross-sectional area and a second cross-sectional area, the first cross-sectional area being larger than the second cross-sectional area such that the first cross-sectional area is oriented away from the scooter and the second cross-sectional area is oriented toward the footboard of the scooter; and a second attachment means located in the support structure, the second attachment means matching one of the plurality of first attachment means such that the skate can be used as a replacement for the wheel;

wherein the support structure is asymmetric relative to the second attachment means and the second cross-sectional area is dimensioned to fit beneath said footboard lower surface in use.

3. A set of two replacement skates as defined in claim 2, wherein the first attachment means is located centrally in the support structure.

4. A set of two replacement skates as defined in claim 2, wherein the support structure has an opening sized to mate securely with a first attachment means of the scooter.

5. A set of two replacement skates as defined in claim 2, wherein the skate blade is made of stainless steel.

6. A set of two replacement skates as defined in claim 2, wherein the skate blade is made of suitable material.

7. A set at two replacement skates as defined in claim 2, wherein each replacement skate is identical to each other.

8. A set of two replacement skates as defined in claim 2, wherein the two replacement skates each are oriented differently.

9. A set of two replacement skates as defined in claim 2, wherein the two replacement skates each have a differently shaped support structure and a differently sized support structure.

10. A kit for replacing two wheels on a scooter with two replacements skates, the scooter having a footboard with low ground clearance and a first attachment means for attaching the two wheels to the scooter, the kit consisting of at least two replacement skates, each replacement skate having:

a skate blade;

a support structure attached to the blade, the support structure having a first cross-sectional area and a second cross-sectional area, the first cross-sectional area being larger than the second cross-sectional area such that the first cross-sectional area is oriented away from the scooter and the second cross-sectional area is oriented toward the footboard of the scooter; and a second attachment means located in the support structure, the second attachment means matching the first attachment means such that the skate can be used as a replacement for the wheel;

wherein the support structure is asymmetric relative to the second attachment means and the second cross-sectional area is dimensioned to fit within the low ground clearance.

11. A kit as defined in claim 10, wherein the first attachment means is located centrally in the support structure.

12. A kit as defined in claim 10, wherein the support structure has an opening sized to mate securely with an attachment means of the scooter.

13. A kit as defined in claim 10, wherein the skate blade is made of stainless steel.

14. A kit as defined in claim 10, wherein the skate blade is made of suitable material.

15. A kit as defined in claim 10, wherein each replacement skate is identical.

16. A kit as defined in claim 10, wherein each of the two replacement skates is oriented differently than a second of the two replacement skates.

17. A kit as defined in claim 10, wherein at least two replacement skates have a differently shaped support structure and a differently sized support structure.

* * * * *